United States Patent [19]
Lee

[11] Patent Number: 5,748,403
[45] Date of Patent: May 5, 1998

[54] MAGNETIC RECORDING AND REPRODUCING APPARATUS HAVING A CASSETTE HOLDER WITH GUIDE PINS

[75] Inventor: Jae-soo Lee, Seoul, Rep. of Korea

[73] Assignee: Samsung Electronics Co., Ltd., Kyungki-do, Rep. of Korea

[21] Appl. No.: 736,946

[22] Filed: Oct. 25, 1996

[30] Foreign Application Priority Data

Dec. 30, 1995 [KR] Rep. of Korea ............... 95-69762

[51] Int. Cl.$^6$ ................................................. G11B 5/008
[52] U.S. Cl. ................................................. 360/96.5
[58] Field of Search ....................... 360/93, 96.1, 96.6, 360/96.5, 99.02, 99.03, 99.06, 99.07; 242/335, 338, 338.4

[56] References Cited

U.S. PATENT DOCUMENTS

| | | | |
|---|---|---|---|
| 4,992,895 | 2/1991 | Kim | 360/96.5 |
| 5,050,022 | 9/1991 | Aizawa | 360/96.5 |
| 5,060,094 | 10/1991 | Chung et al. | 360/96.5 |
| 5,249,088 | 9/1993 | Matsuda et al. | 360/96.5 |
| 5,371,641 | 12/1994 | Kim | 360/96.5 |
| 5,493,460 | 2/1996 | Lee | 360/96.5 |
| 5,615,066 | 3/1997 | Shibata | 360/96.5 |
| 5,629,818 | 5/1997 | Schandl et al. | 360/96.5 |

Primary Examiner—Stuart S. Levy
Assistant Examiner—David L. Ometz
Attorney, Agent, or Firm—Sughrue, Mion, Zinn, Macpeak & Seas, PLLC

[57] ABSTRACT

A magnetic recording and reproducing apparatus, including a pair of side chassis having predetermined guide slots, and a cassette holder assembly, which includes a cassette holder having guide pins movably inserted into the guide slots, arm members respectively installed on inner sides of the side chassis and having slots into which the guide pins of the cassette holder are inserted, with at least one of the arm members having a guide protrusion. A cam gear is installed between the at least one arm member and a corresponding one of the side chassis and has a cam groove into which the guide protrusion of the at least one arm member is inserted and which has a pressing portion which rotates the at least one arm member according to a position of rotation. An elastic member is extended across the cam groove formed in the cam gear and has one end portion which elastically controls movement of the guide protrusion according to the rotation of the at least one arm member when the cam gear stops and another end portion which elastically presses the guide protrusion of the at least one arm member when the cam gear rotates. The apparatus further includes a portion for rotatively driving the cam gear.

5 Claims, 6 Drawing Sheets

MAGNETIC RECORDING AND REPRODUCING APPARATUS HAVING A CASSETTE HOLDER WITH GUIDE PINS

BACKGROUND OF THE INVENTION

The present invention relates to a magnetic recording and reproducing apparatus and, more particularly, to a magnetic recording and reproducing apparatus having a cassette holder assembly which can absorb a shock generated when a cassette tape used as a magnetic recording medium is loaded into a deck.

A magnetic recording and reproducing apparatus has a cassette holder assembly for loading the cassette tape into the deck. When the cassette holder assembly, where the cassette tape is inserted, reaches a predetermined position inside a magnetic recording and reproducing apparatus, a cassette loading operation thereof is performed by activating a switch installed inside the apparatus. Generally, the cassette holder assembly includes a cassette holder into which a cassette is inserted, an arm which rotates so as to move the cassette holder, and a rack gear for transmitting driving power of a loading motor to the arm. Also, various structural elements for relieving a shock which can be generated when inserting the cassette are provided to allow a smooth loading operation.

FIG. 1 is a perspective view showing an internal structure of the magnetic recording and reproducing apparatus. The magnetic recording and reproducing apparatus includes a main chassis 11, side chassis 12,12 installed on the left and right sides thereof, a drum assembly 13 inside of which a magnetic head is included, and a pinch roller assembly 14 for guiding the magnetic tape. A cassette holder assembly 15 is installed between the side chassis 12,12.

FIG. 2 is an exploded perspective view of the side chassis 12,12 shown in FIG. 1 and the cassette holder assembly 15. The cassette holder assembly 15 has a cassette holder 26 into which a cassette is inserted. An upper plate 27 is combined to an upper portion of the cassette holder 26. Two guide pins 24 and 25 are respectively formed on both sides of the cassette holder 26.

Guide slots 22 and 23 respectively having a horizontal and a vertical portion are formed on the respective sides of the side chassis 12,12. The guide pins 24 and 25 of the cassette holder 26 are respectively inserted into the guide slots 22 and 23. The cassette holder 26 where the cassette tape is inserted moves along the guide slots 22 and 23, thus moving in horizontal and vertical directions.

A pair of arms 28 are arranged between both side walls of the cassette holder 26 and the side chassis 12,12. Fork portion 28a is formed in each arm 28. The guide pins 24 are inserted into the fork portions 28a. A spring 31 (refer to FIGS. 3A and 3B) is fixed to each arm 28. A gear portion 29 is formed on one of the two arms 28. A rack gear 33 (refer to FIG. 3A) rotates the arms 28 by transmitting the driving power of a loading motor (not shown) to the gear portion 29. The rotation of the arms 28 moves the cassette holder 26 by moving the guide pins 24 inserted into the fork portions 28a. The rotation of the arms 28 is performed simultaneously since a shaft 30 is connected between both arms 28.

FIGS. 3A and 3B are side views for describing the operation of the cassette holder assembly shown in FIG. 2.

FIG. 3A shows the position at which the operation of the cassette holder assembly begins. The string 31 is attached to protrusions 34 formed on the arms 28, wherein one end 31a of the spring 31 is fixed and the other end 31b is extended toward the fork portion 28a.

When the cassette holder 26 where the cassette tape 32 is inserted is pushed inside the apparatus, the cassette holder 26 can move without any resistance until it reaches a predetermined position. When the cassette holder 26 reaches the predetermined position, the loading motor rotates upon the activation of a switch or sensor installed in the apparatus. The rack gear 33 moves horizontally from the left side to the right side of the drawing due to the rotation of the loading motor. The horizontal movement of the rack gear 33 is converted into the rotating movement of the arms 28 through the gear portion 29 of the arm 28. Therefore, the rotating power of the arms 28 is transferred to the guide pins 24 of the cassette holder 26 inserted into the fork portions 28a of the arms 28 and thus the cassette holder 26 begins to move along the guide slot 22.

FIG. 3B shows the state in which loading of the cassette tape is completely performed. At this stage, the rack gear 33 is completely moved to the right side and, accordingly, the rotation of the arms 28 is completed. Furthermore, the cassette holder 26 is set in the main chassis 11. As shown in FIG. 3B, the end portions 31b of the springs 31 extended to the fork portions 28a of the arms 28 are elastically contacted with the circumference of the guide pin 24. Accordingly, it is possible to prevent the cassette holder 26 from moving from the state in which the cassette holder 26 is set in the main chassis.

The previously proposed cassette holder assembly described above cannot relieve the shock which can be generated during the insertion of the cassette tape. Namely, the shock generated by the careless insertion of a cassette tape can be transmitted to the gear portion 29 of the arm 28 and the rack gear 33 through the guide pins 24 of the cassette holder 26. Such a shock can damage the guide pins 24, the gear portion 29 of the arm 28, or the rack gear 33 and hinder a smooth engagement of the gear portion 29 of the arm 28 and the rack gear 33.

SUMMARY OF THE INVENTION

It is an object of the present invention to provide a magnetic recording and reproducing apparatus in which a cassette tape is smoothly inserted.

It is another object of the present invention to provide a magnetic recording and reproducing apparatus having a cassette holder assembly which can relieve a shock generated during the insertion of the cassette tape.

To achieve the above object, there is provided a magnetic recording and reproducing apparatus, comprising a pair of side chassis having predetermined guide slots, and a cassette holder assembly, the cassette holder assembly including a cassette holder having guide pins movably inserted into the guide slots, arm members respectively installed on inner sides of the side chassis and having slots into which the guide pins of the cassette holder are inserted, with at least one of the arm members having a guide protrusion, a cam gear installed between the at least one arm member and a corresponding one of the side chassis and having a cam groove into which the guide protrusion of the at least one arm member is inserted and which has a pressing portion which rotates the at least one arm member according to a position of rotation, an elastic member which is extended across the cam groove formed in the cam gear and having one end portion which elastically controls movement of the guide protrusion according to the rotation of the at least one arm member when the cam gear stops and another end portion which elastically presses the guide protrusion of the at least one arm member when the cam gear rotates.

The elastic member comprises a torsion spring fixed to the center of the cam gear in which the one end portion is fixed across the cam groove and the other end portion is supported by a protrusion formed in one side of the cam gear across the cam groove.

The guide protrusion of the at least one arm member elastically contacts the fixed end portion of the spring according to the insertion of the cassette holder.

The other end portion of the elastic member moves away from the protrusion and presses the guide protrusion of the at least one arm member according to the rotation of the at least one arm member and the cam gear.

The guide protrusion of the at least one arm member passes through the cam groove of the cam gear and moves, being inserted into a groove rail formed in the internal side of the corresponding one of the side chassis.

BRIEF DESCRIPTION OF THE DRAWINGS

The above objects and advantages of the present invention will become more apparent by describing in detail a preferred embodiment thereof with reference to the accompanying drawings, in which.

DETAILED DESCRIPTION OF THE PREFERRED EMBODIMENT

Figure 4:
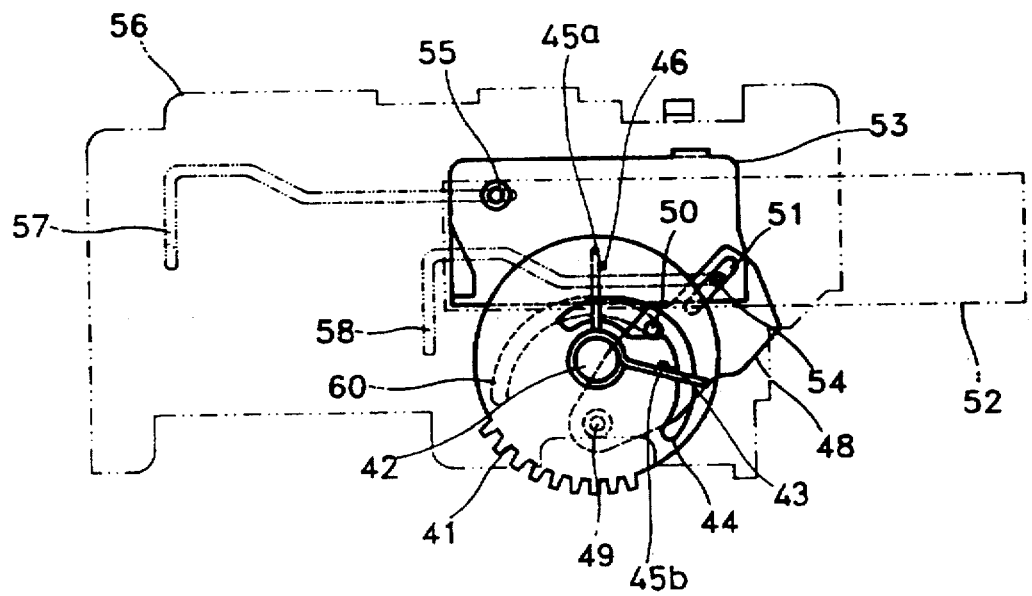
FIG. 4 is a schematic side view showing a construction of a cassette holder assembly of the present invention.

FIG. 4 is a schematic side view showing the construction of one side of a cassette holder assembly for a magnetic recording and reproducing apparatus of the present invention.

Referring to FIG. 4, a cassette holder 53 is arranged between a pair of side chassis 56,56 being separated from each other. A pair of arms 48 are arranged between both sides of the cassette holder 53 and inner sides of the side chassis 56,56. A cam gear 41 is arranged between at least one arm 48 and the corresponding side chassis 56.

Guide pins 54 and 55 are formed on the external sides of the cassette holder 53 and are inserted into respective guide slots 57 and 58 formed in the inner sides of the side chassis 56,56. Therefore, the guide slots 57 and 58 determine the moving path of the cassette holder 53.

Since a shaft 49, arranged in the internal sides of the two side chassis 56,56, is connected between the two arms 48, the two arms 48 can rotate at the same time. As noted from a perspective view of one of the arms 48 shown in FIG. 5A, the arms 48 each have a slot 51 and a guide protrusion 50. The guide pins 54 of the cassette holder 53 are inserted into the guide slots 58 through the slots 51 of the arms 48.

Figure 5B:
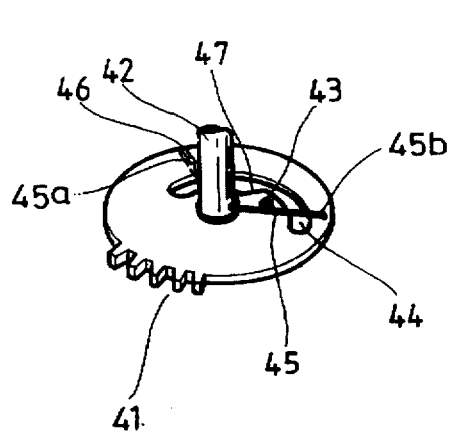
FIGS. 5A and 5B are perspective views of main parts of the cassette holder assembly of FIG. 4.
Figure 5A:
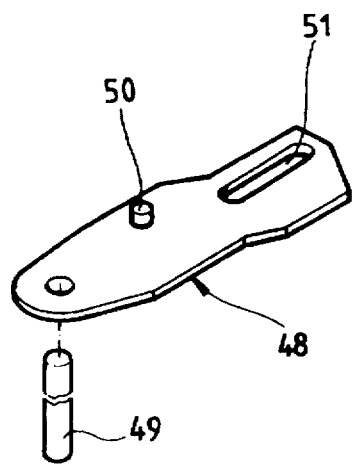

The cam gear 41 has a spring 45, placed on the shaft 42, and a cam groove 44 formed in the body of the cam gear 41, as shown in FIG. 5B. Also, the cam gear 41 has a toothed portion T formed on either the circumference of the body, or one side of the body of the cam gear 41. The toothed portion T formed in the cam gear 41 gears with the rack gear 33 of FIG. 3A and is rotated by a loading motor (not shown). The spring 45 is a torsion coil spring having one end portion 45a and the other end portion 45b contacting both sides of the cam gear 41. The coil portion of the spring 45 is inserted onto the shaft 42 of the cam gear 41. The end portion 45a is fixed to a spring fixing portion 46 and the other end portion 45b is elastically supported by the protrusion 43. When counterclockwise power is applied to the end portion 45b of the spring 45 supported by the protrusion 43, the end portion 45b of the spring 45 rotates against elastic resistance. The guide protrusion 50 formed on the at least one arm 48 is inserted into the cam groove 44 of the cam gear 41.

Figure 3A:
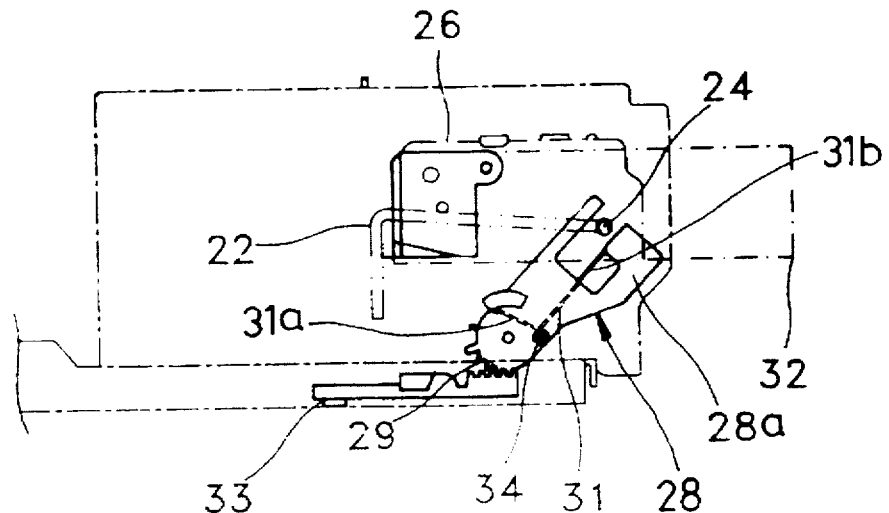
FIGS. 3A and 3B are side views for describing an operation of the previously proposed cassette holder assembly.
Figure 3B:
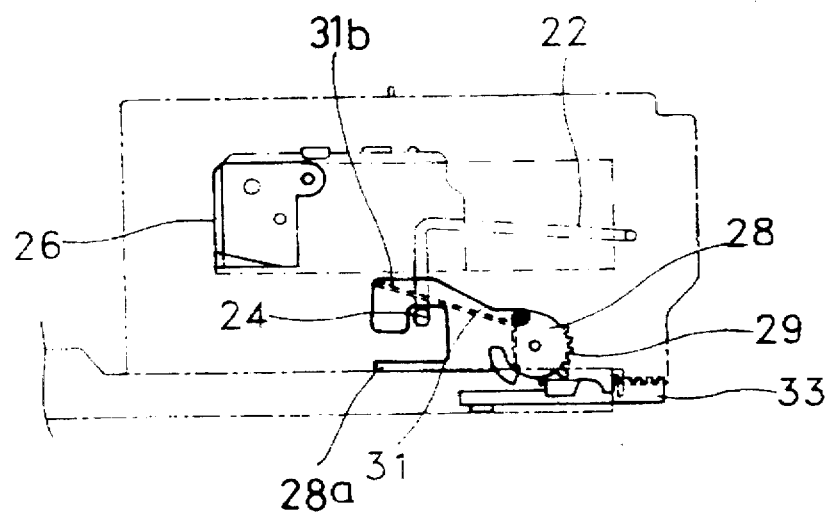

The rotation of the loading motor is converted into the rotation of the cam gear 41 and the rotation of the arms 48 via the rack gear 33 of FIG. 3A. A pressing portion 47 is formed in the cam groove 44 so that the rotation of the cam gear 41 can cause the rotation of the arms 48. The pressing portion 47 causes the rotation of the arms 48 by contacting the guide protrusion 50 of the arm 48 according to the rotation of the cam gear 41. The guide protrusion 50 of the arm 48 is inserted into an arc-shaped groove rail 60, formed in the internal side of the side chassis 56, through the cam groove 44 of the cam gear 41.

Hereinafter, the operation of the cassette holder assembly according to the present invention will be described in detail with reference to FIGS. 6A to 6D.

Figure 6A:
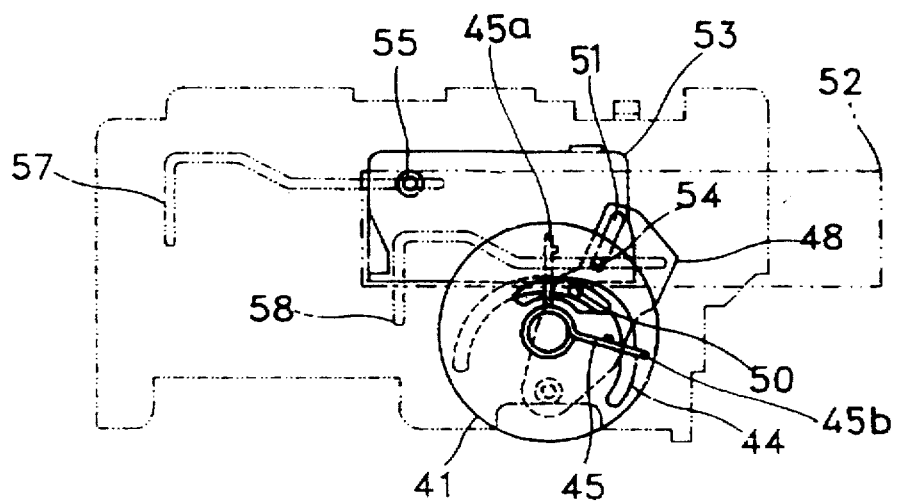
FIGS. 6A, 6B, 6C and 6D are side views for describing the operation of the cassette holder assembly of FIG. 4.

FIG. 6A shows an initial insertion state of a cassette tape 52. When the cassette tape 52 is inserted into the cassette holder 53, the cassette holder 53 can move freely until it reaches a predetermined position. Since guide pins 54 of the cassette holder 53 pass through the slots 51 of the arms 48, the movement of the cassette holder 53 causes the rotation of the arms 48. Since the guide protrusion 50 formed in the arm 48 moves in the cam groove 44 of the cam gear 41, when the arms 48 rotate in the counterclockwise direction, the guide protrusion 50 contacts the end portion 45a of the spring 45 which crosses the cam groove 44. Accordingly, even though the cassette tape 52 is forcibly inserted, a shock is elastically relieved since the guide protrusion 50 of the arm 48 contacts the end portion 45a of the spring 45. Namely, the initial movement of the cassette holder 53 and the initial rotation of the arms 48 due to the insertion of the cassette tape 52 can smoothly be performed without transferring the excessive force to other component parts of the cassette holder assembly.

Figure 6B:
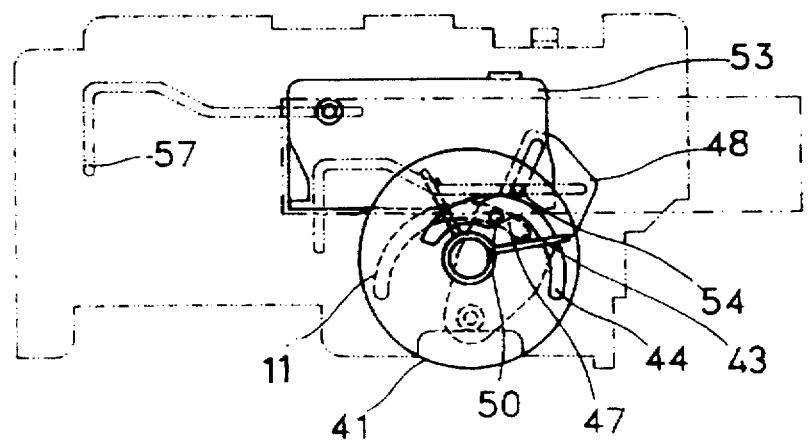

When the cassette holder 53 moves further and reaches the predetermined position, the loading motor operates due to the activation of the switch or sensor installed in the apparatus and the cam gear 41 rotates due to the movement of the rack gear 33 of FIG. 3A caused by the rotation of the loading motor. The cam gear 41 rotates in the counterclockwise direction during the insertion of the cassette tape and, as a result, the pressing portion 47 of the cam groove 44 contacts the guide protrusion 50 of the arm 48 as shown in FIG. 6B. The continued rotation of the cam gear 41 causes the counterclockwise rotation of the arms 48 and applies power to each guide pin 54 of the cassette holder 53 which passes through the slot 51 of each arm 48. The loading of the cassette tape is performed as the guide pins 54 of the cassette holder 53 move along the guide slots 58 formed in the inner sides of the side chassis 56,56.

Figure 1:
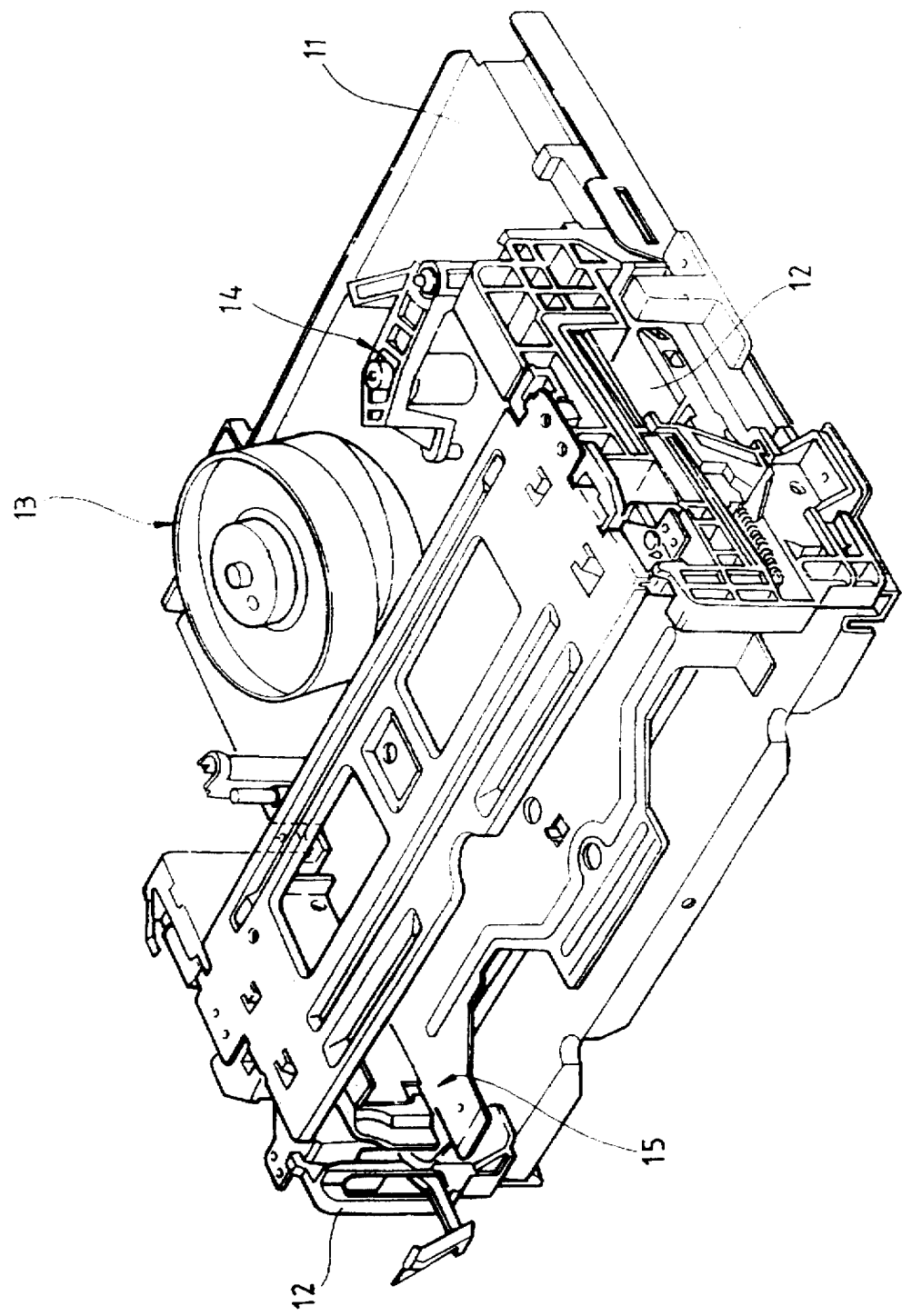
FIG. 1 is a perspective view showing an internal construction of a magnetic recording and reproducing apparatus.
Figure 2:
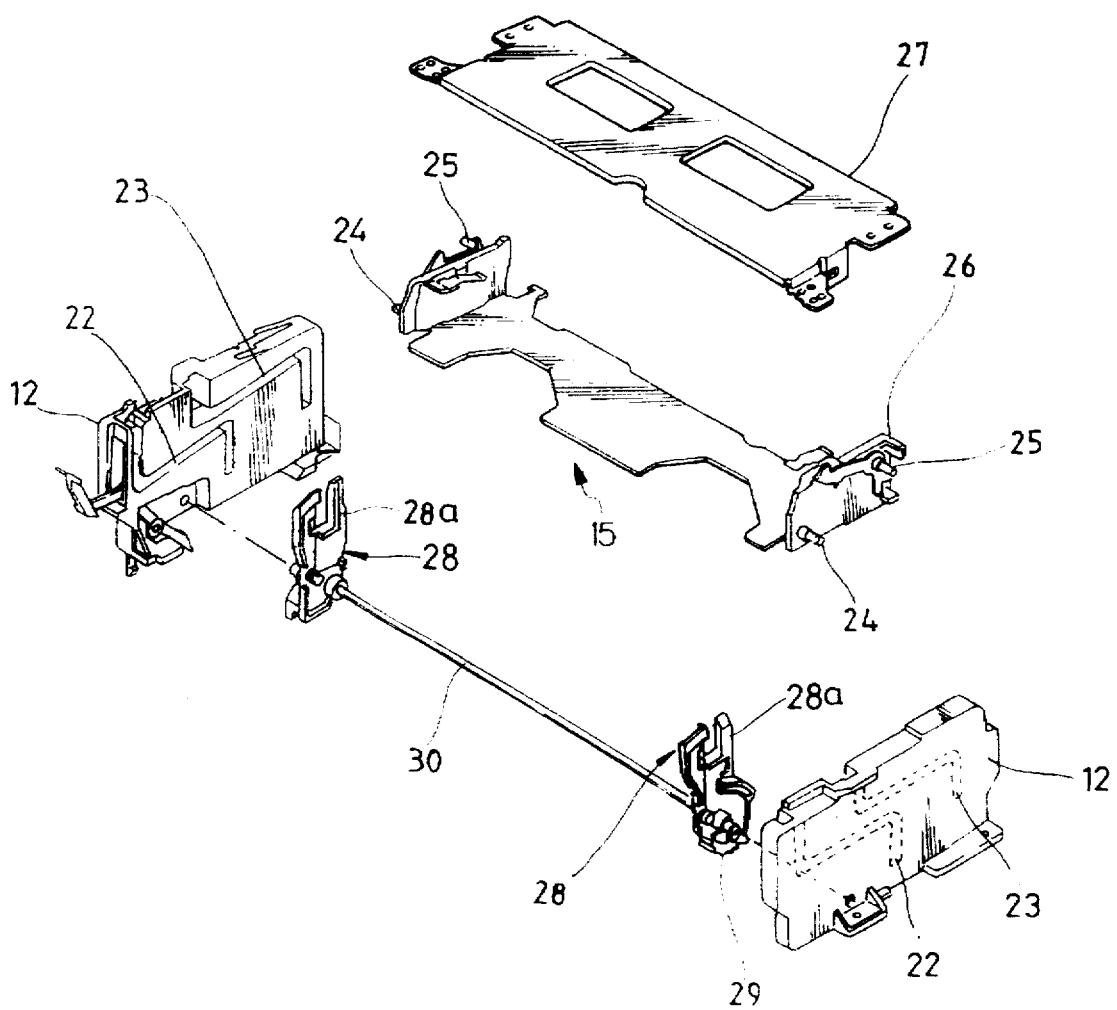
FIG. 2 is an exploded perspective view showing side chassis and a previously proposed cassette holder assembly.
Figure 6C:
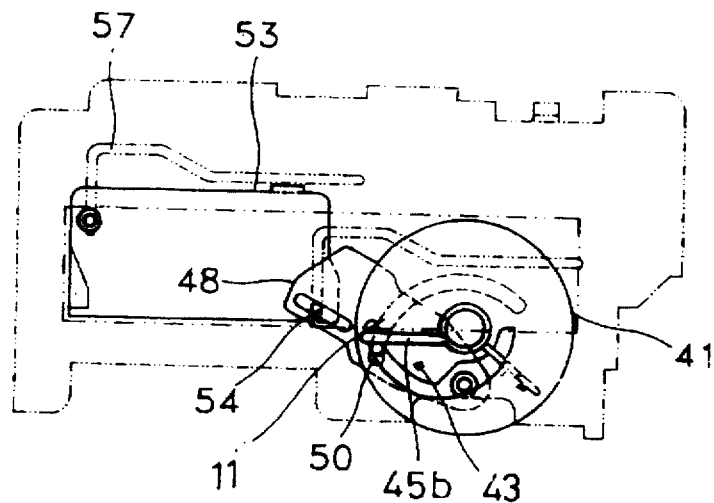

FIG. 6C shows the loading state of the cassette tape 52. Referring to FIG. 6C, the arms 48 are rotated to the maximum degree by the cam gear 41 and the cassette holder 53 loads the cassette tape 52 in the loading position on the main chassis 11 of FIG. 1. At this time, the guide protrusion 50 of the arm 48 moves past the pressing portion 47 formed in the cam groove 44 of the cam gear 41 and contacts the end portion 45b of the spring 45 crossing the cam groove 44. In the position shown in FIG. 6C, the end portion 45b of the spring 45 moves away from the protrusion 43 formed on the surface of the cam gear 41.

Figure 6D:
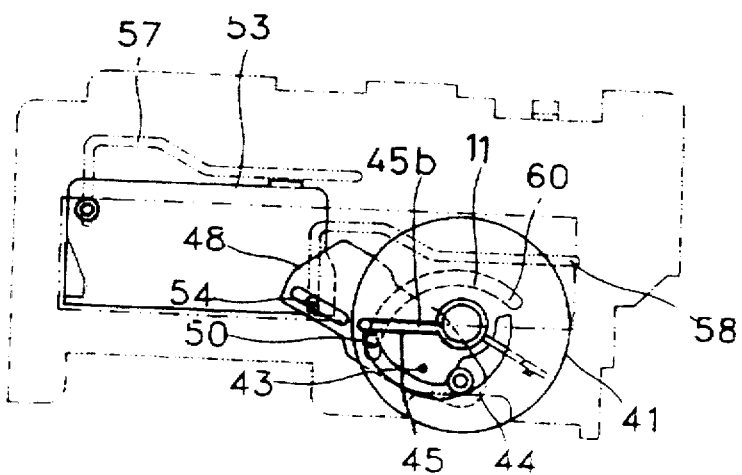

FIG. 6D shows that the rotation of the cam gear 41 proceeds from the position shown in FIG. 6C. In FIG. 6D, the position of the cassette holder 53 and the arms 48 coincides with that of the FIG. 6C and only the rotation of the cam gear 41 proceeds from the position of FIG. 6C. As shown in FIG. 6D, the cam gear 41 rotates until the guide protrusion 50 of the arm 48 contacts the end portion of the cam groove 44 formed in the cam gear 41. In such a position, the cassette holder 53 can be supported in a predetermined position of the main chassis at an appropriate pressure by an elastic force of the end portion 45b of the spring 45.

In ejecting the cassette tape, the operations described with reference to FIGS. 6A through 6D occur in the reverse order. Namely, when the loading motor is driven in the opposite direction, the cam gear 41 rotates in the clockwise direction. The rotation of the cam gear 41 causes the clockwise rotation of the arms 48 and the movement of the cassette holder 53.

The magnetic recording and reproducing apparatus having the cassette holder assembly according to the present invention can prevent damage of the main parts due to shock and poor operation. Also, the parts used to construct the cassette holder assembly are simplified, thus facilitating manufacture and assembly and saving costs.

The present invention is not restricted to the above embodiment, and it is clearly understood that many variations are possible within the spirit and scope of the present invention by those skilled in the art.

What is claimed is:

1. A magnetic recording and reproducing apparatus, comprising:

a pair of side chassis having predetermined guide slots; and;

a cassette holder assembly, said cassette holder assembly including a cassette holder having guide pins movably inserted into said guide slots, an arm member installed on an inner side of each of said chassis and each of said arm members having a slot into which a respective one of the guide pins of said cassette holder is inserted, with at least one of said arm members having a guide protrusion, a cam gear installed between said at least one arm member and a corresponding one of said side chassis and having a cam groove into which said guide protrusion of said at least one arm member is inserted and said cam groove having a pressing portion which rotates said at least one arm member according to a position of rotation of said cam gear, an elastic member which is extended across the cam groove formed in said cam gear and having one end portion which elastically controls movement of said guide protrusion according to the rotation of said at least one arm member when said cam gear stops and another end portion of said elastic member which elastically presses the guide protrusion of said at least one arm member when said cam gear rotates.

2. The magnetic recording and reproducing apparatus as claimed in claim 1, wherein said elastic member comprises a torsion spring fixed to a center of said cam gear in which the one end portion is fixed across said cam groove and the other end portion is supported by a protrusion formed in one side of said cam gear across said cam groove.

3. The magnetic recording and reproducing apparatus as claimed in claim 2, wherein the guide protrusion of said at least one arm member elastically contacts the fixed end portion of said torsion spring according to the insertion of said cassette holder.

4. The magnetic recording and reproducing apparatus as claimed in claim 2, wherein the other end portion of said torsion spring moves away from said protrusion of said cam gear and presses the guide protrusion of said at least one arm member according to the rotation of said at least one arm member and said cam gear.

5. The magnetic recording and reproducing apparatus as claimed in claim 1, wherein said guide protrusion of said at least one arm member passes through the cam groove of said cam gear and moves, being inserted into a groove rail formed in an internal side of said corresponding one of said side chassis.

* * * * *